(12) United States Patent
Elenga et al.

(10) Patent No.: US 9,768,674 B2
(45) Date of Patent: Sep. 19, 2017

(54) PRINTED-CIRCUIT BOARD COIL AND MOTOR

(71) Applicant: RESONANT SYSTEMS, INC., Seattle, WA (US)

(72) Inventors: Robin Elenga, Seattle, WA (US); Brian Pepin, Oakland, WA (US); Dan Knodle, Seattle, WA (US)

(73) Assignee: Resonant Systems, Inc., Seattle, WA (US)

( * ) Notice: Subject to any disclaimer, the term of this patent is extended or adjusted under 35 U.S.C. 154(b) by 428 days.

(21) Appl. No.: 14/487,010

(22) Filed: Sep. 15, 2014

(65) Prior Publication Data

US 2015/0076929 A1  Mar. 19, 2015

Related U.S. Application Data

(60) Provisional application No. 61/877,602, filed on Sep. 13, 2013.

(51) Int. Cl.
| | |
|---|---|
| *H02K 41/02* | (2006.01) |
| *H02K 33/16* | (2006.01) |
| *H02K 41/035* | (2006.01) |
| *H02K 3/26* | (2006.01) |

(52) U.S. Cl.
CPC ......... *H02K 33/16* (2013.01); *H02K 41/0356* (2013.01); *H02K 3/26* (2013.01)

(58) Field of Classification Search
CPC ...... H02K 33/18; H02K 3/26; H02K 2203/03; H02K 33/16; H02K 41/0356

USPC .. 310/12.15, 12.21–12.22, 25, 180, 179, 81, 310/184, 198

See application file for complete search history.

(56) References Cited

U.S. PATENT DOCUMENTS

| | | | | |
|---|---|---|---|---|
| 4,728,390 | A | * | 3/1988 | Yamamoto ............. H01F 5/003 216/105 |
| 4,760,294 | A | * | 7/1988 | Hansen .................. H01F 5/003 310/13 |
| 5,398,400 | A | | 3/1995 | Breen |
| 6,339,266 | B1 | | 1/2002 | Tanaka |
| 6,720,680 | B1 | | 4/2004 | Tanaka |
| 2001/0048256 | A1 | * | 12/2001 | Miyazaki ................ H04R 7/04 310/81 |
| 2004/0032011 | A1 | | 2/2004 | Warner et al. |
| 2004/0070294 | A1 | * | 4/2004 | Hanada .................. H04R 9/047 310/81 |
| 2004/0155747 | A1 | | 8/2004 | Reinicke |
| 2012/0235647 | A1 | * | 9/2012 | Chung .................... G01P 15/11 322/3 |

(Continued)

*Primary Examiner* — Thanh Lam
(74) *Attorney, Agent, or Firm* — Olympic Patent Works PLLC

(57) ABSTRACT

The present document discloses motors and motor components that are constructed on a planar substrate. In some implementations, the planar substrate is made from rigid or semi-rigid sheet material, such as a printed circuit board ("PCB"). One or more coils are formed using spiral-shaped conductive traces that overlay the front and/or back surfaces of the substrate. In one implementation, a plurality of alternating right-hand and left-hand spiral-shaped conductive traces are separated by insulating layers, and connected with conductive vias to form inductive coils. Alternative coil-configurations include single-drive counter-wound coils and coils having a central ferrous or magnetic core.

20 Claims, 20 Drawing Sheets

(56) References Cited

U.S. PATENT DOCUMENTS

2013/0286151 A1* 10/2013 Wakabayashi ....... G02B 7/1821
  347/247
2013/0335157 A1* 12/2013 Ishii ................... H01L 41/0475
  331/158

* cited by examiner

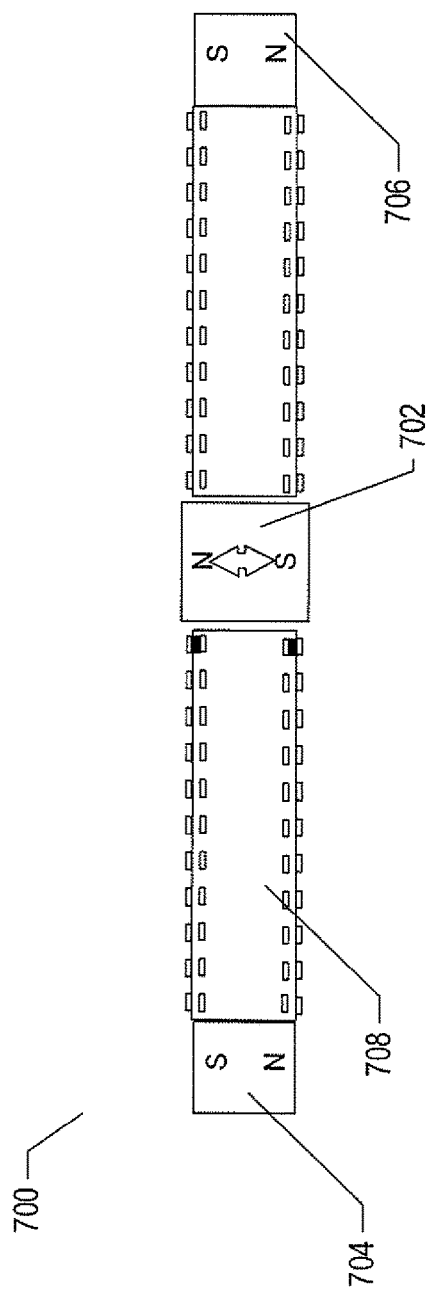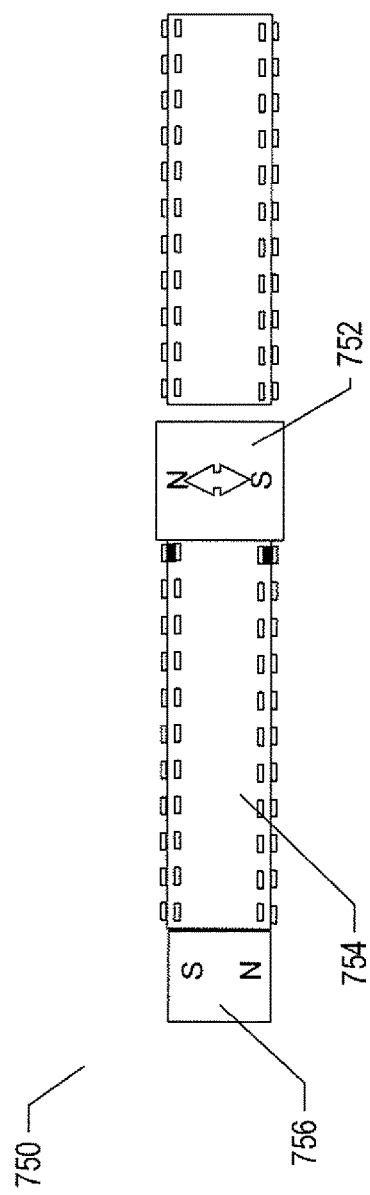
FIG. 7A
FIG. 7B

PRINTED-CIRCUIT BOARD COIL AND MOTOR

CROSS-REFERENCE TO RELATED APPLICATION

This application claims the benefit of Provisional Application No. 61/877,602, filed Sep. 13, 2013.

TECHNICAL FIELD

The present disclosure is directed to the field of electric motors and, in particular, to vibratory electric motors.

BACKGROUND

Haptic feedback in the form of vibration plays a role in the way users interact with their electronic devices. For example, vibration of mobile phones notifies a user of an incoming message or alarm. Motors that generate vibration in small form factor mobile devices tend to produce a limited range of vibration frequencies. Current motor technologies include small DC rotary motors that generate vibrations by spinning an unbalanced load and piezoelectric vibrators that typically vibrate near a single resonant frequency. As a result, mobile device designers are limited to using vibration patterns, such as ON-OFF and ON-OFF-ON-OFF, to differentiate different types of device notifications. Most humans are limited in their ability to reliably remember more than three to four different types of single-frequency ON-OFF vibration patterns and match them with a given type of notification.

SUMMARY

The present document discloses motors and motor components that are constructed on a planar substrate. In some implementations, the planar substrate is made from rigid or semi-rigid sheet material, such as a printed circuit board ("PCB"). One or more coils are formed using spiral-shaped conductive traces that overlay the front and/or back surfaces of the substrate. In one implementation, a plurality of alternating right-hand and left-hand spiral-shaped conductive traces are separated by insulating layers, and connected with conductive vias to form inductive coils. Alternative coil-configurations include single-drive counter-wound coils and coils having a central ferrous or magnetic core.

In certain implementations the coil structures are employed as stators. In one implementation, a stator is formed around an opening in the substrate and a magnetic drive element is retained in the opening and moves perpendicularly to the surface of the substrate in response to a signal applied to the stator. In another implementation, a drive element on the surface of the substrate moves parallel to the surface of the substrate.

BRIEF DESCRIPTION OF THE DRAWINGS

FIG. 7A illustrates a motor with symmetric magnetic retaining elements.
FIG. 7B illustrates a motor with an asymmetric magnetic retaining element.

DETAILED DESCRIPTION

The present document discloses motors and motor components that are constructed on a planar substrate. In certain implementations, the motors may be employed in personal mobile devices, such as cell phones, and may be vibrated at different frequencies to indicate different types of notifications to users. On some mobile devices, a number of motors are deployed in an array to produce distinctive patterns of vibration that are identifiable to a human user. The present document is organized into four sections. The first section describes motor components that include a coil constructed from one or more spiral-shaped conductive traces. The second section describes a variety of motors that can produce linear vibratory motion. The third section describes various applications of the motors. The final section describes how the motors are applied as a generator.

Motor Components

A motor includes moving and non-moving components that interact via electromagnetic forces to produce motion. The non-moving components include a stator that generates a magnetic field. A stator can be created by using one or more coils. In certain implementations, a stator adapted to integration with a planar substrate is produced using combinations of one ore more spiral-shaped conductive traces.

Figure 1:
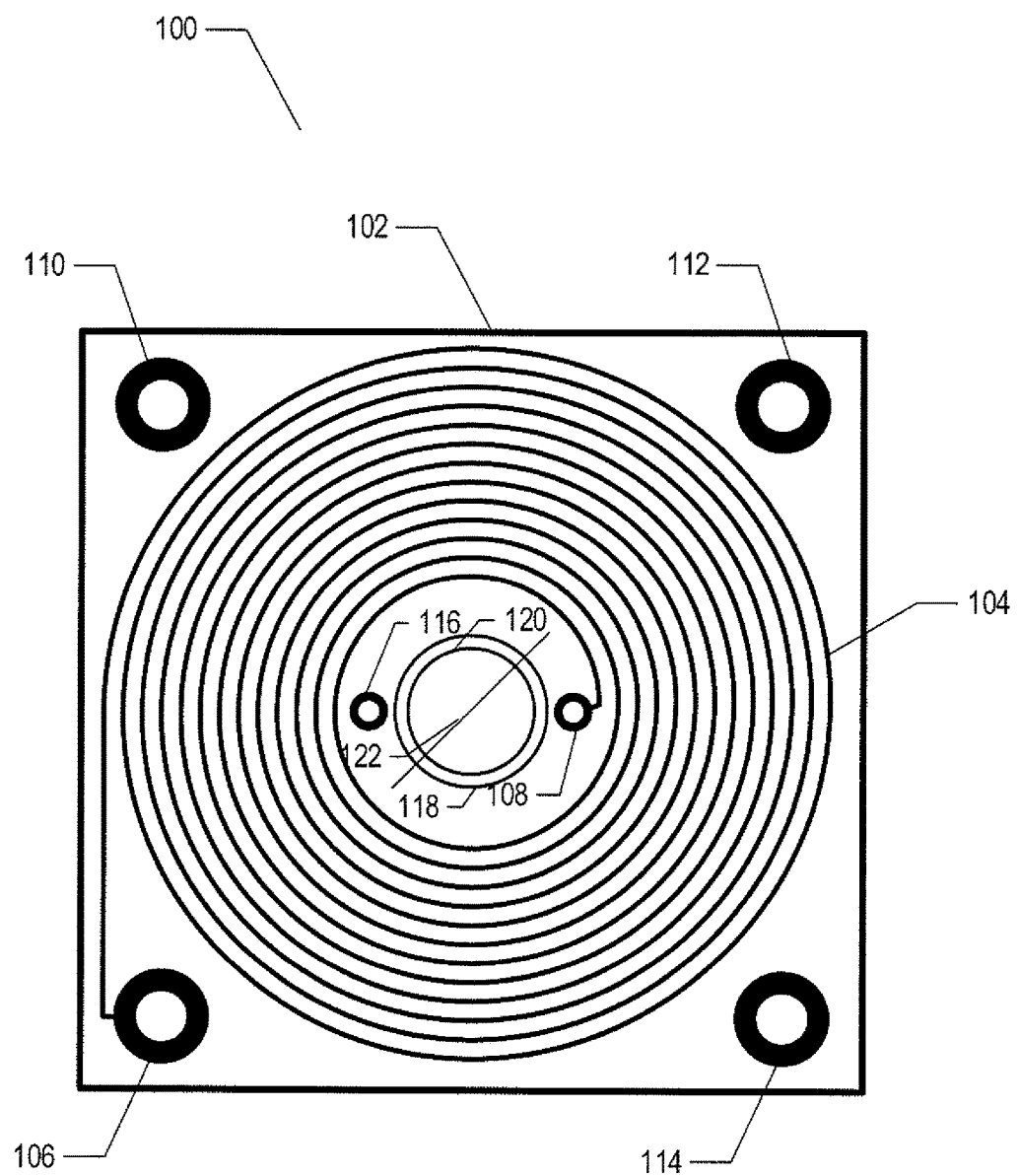
FIG. 1 illustrates a first coil layer.

FIG. 1 illustrates a first coil layer. The first coil layer 100 includes a substrate 102 and a spiral-shaped trace 104 that is wound in a clockwise direction from the outside of the spiral to the inside of the spiral. The spiral-shaped trace 104 surrounds a central core and overlays the substrate 102. In some implementations, the substrate 102 is a printed circuit board. The width and thickness of the trace influence the conductivity of the resulting coil. In general, thicker and wider traces have lower electrical resistance and result in coils with lower resistance and higher current carrying capacity. Spirals with a larger core diameter and spirals having a larger number of turns produce coils with correspondingly higher inductance. The inductance of the spiral-shaped trace 104 with an air core at the center of the spiral is expressed as:

$$L\,(uH) = \frac{r^2 N^2}{(8r + 11W)}$$

where:
r is the core radius in inches;
N is the number of turns; and
W is the total width of the windings in inches.
The inductance of the resulting coil can be adjusted by altering the above parameters, as well as through the selection of core materials, as will be illustrated later in this document.

A first connection pad 106 and a second connection pad 108 terminate the ends of the spiral-shaped trace 104. In certain implementations, the first connection pad 106 and/or the second connection pad 108 are incorporated into one or more conductive vias connecting the first coil layer to other coil layers or to electrical circuits constructed on the substrate. Additional connection pads 110, 112, 114, and 116 can provide connection points or can be incorporated into vias that connect multiple layers of traces.

FIG. 1 additionally illustrates the placement of a number of motor elements in a particular motor implementation. At the center of the spiral-shaped trace 104 is a circular opening 118. The circular opening provides a space for an armature 120. The armature 120 can be made from a ferrous metal or a magnetic material and moves in a direction substantially perpendicular to the surface of the substrate 102 in response to a drive current applied to the coil layer. A centering spring 122 retains the armature 120 in the circular opening 118 in the substrate 102, and allows limited movement perpendicular to the substrate.

In certain implementations, the traces and connection pads are made from conductive material, such as metal, copper, aluminum, or conductive alloys. The traces and connection pads on the first coil layer 100 can be fabricated using well-known printed circuit board ("PCB") manufacturing techniques. In some implementations, foil decals are created and laminated onto the substrate 102. The construction of multi-layer coils is achieved using a number of techniques, including: multi-layer PCB construction; laminated foil decals separated by insulating layers; and 2-sided PCB construction. In some implementations, the traces and connection pads are embedded into the substrate 102.

Figure 2:
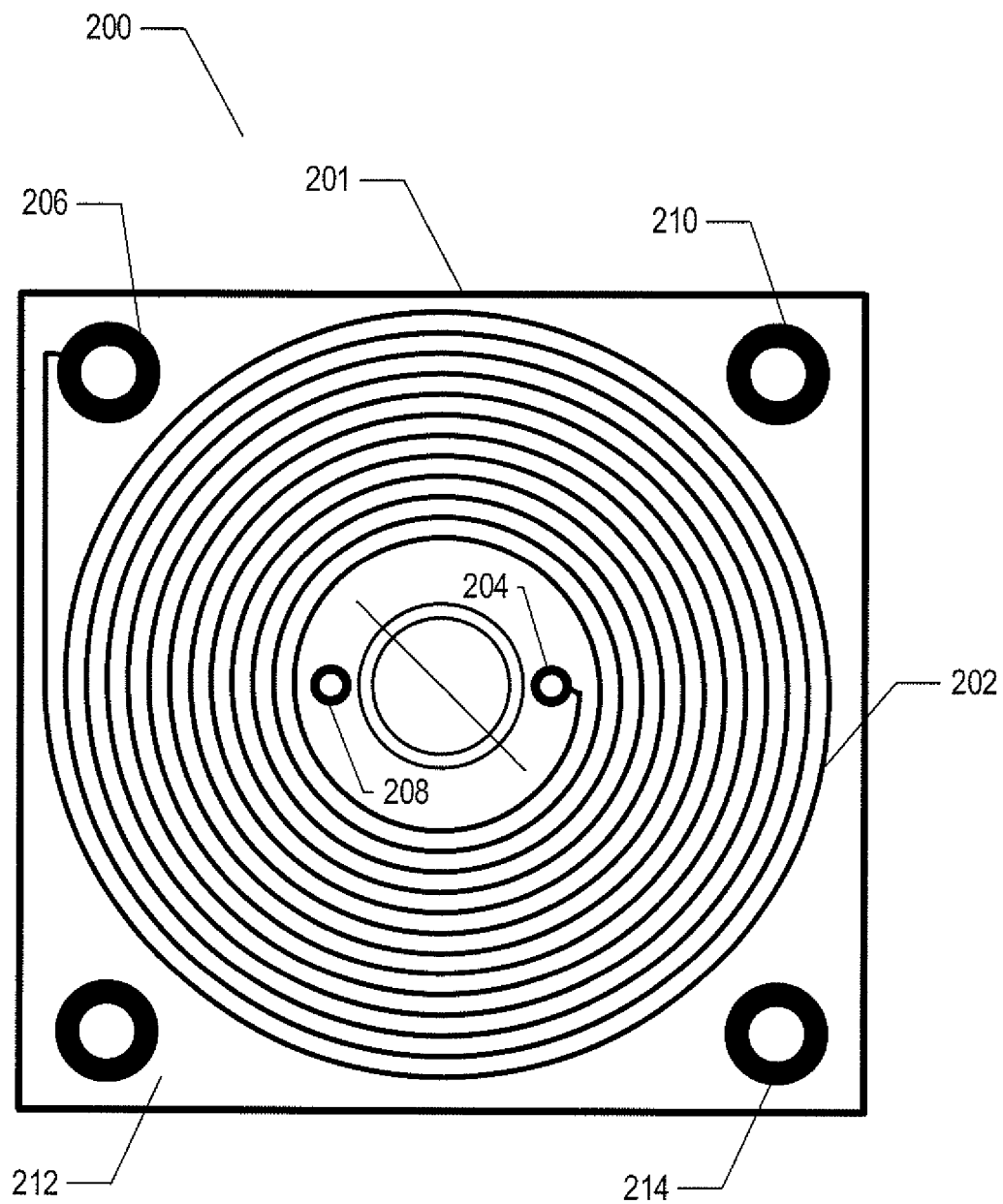
FIG. 2 illustrates a second coil layer.

FIG. 2 illustrates a second coil layer. The second coil layer 200 is constructed using techniques already described for the construction of the first coil layer 100. A spiral-shaped trace 202 winds in a clockwise direction from the starting connection pad 204 to the ending connection pad 206. The coil layer of FIG. 1 is positioned over the coil layer of FIG. 2 and the two layers are aligned with one another so that the second connection pad 108 in FIG. 1 overlays the starting connection pad 204 in FIG. 2, and the connection pad 110 in FIG. 1 aligns with the ending connection pad 206 in FIG. 2. PCB vias form electrical connections between the second connection pad 108 in FIG. 1 and the starting connection pad 204. When the first coil layer 100 in FIG. 1 and the second coil layer 200 in FIG. 2 are connected in this way and energized, the inductance of the layers is additive. In one mode of operation, current flows into the coil layer of FIG. 1 starting at the first connection pad 106, clockwise around the coil to the second connection pad 108, through a via to the starting connection pad 204, and clockwise to the ending connection pad 206. Adding additional coil layers increases the total inductance of the resulting coil. Additional connection pads 208, 210, 212, and 214 provide connection points and support for vias that connect to additional coil layers. In certain implementations, additional coil layers can be added to the coil using similar methods to those described above. The additional coil layers are separated by insulating layers or placed on opposite sides of an insulating substrate. In certain implementations, the multi-layer coil is used as a stator in a motor.

Figure 3A:
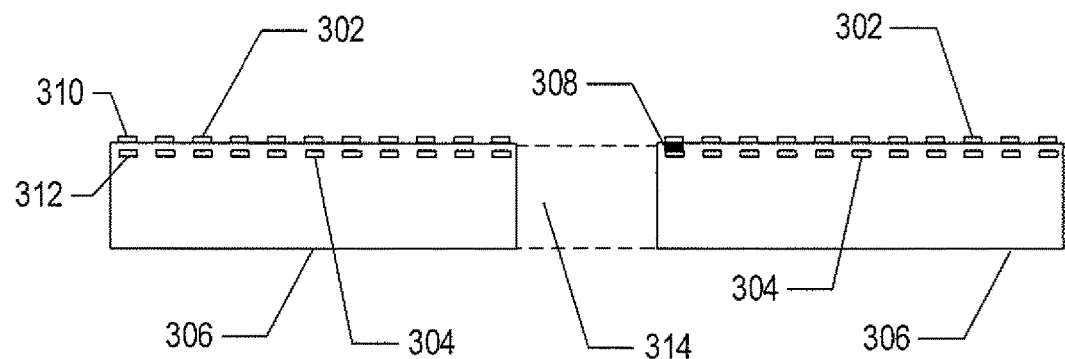
FIG. 3A illustrates a cross-section of a stator having two coil layers.

FIG. 3A illustrates a cross-section of a stator having two coil layers. A first coil layer 302 and a second coil layer 304 are laminated onto an insulating planar substrate 306, such as a PCB. The first and second coil layers 302 and 304 are separated by an insulating layer and electrically connected to each other with a via 308. The stator is driven by a first connection pad 310 and a second connection pad 312. In certain implementations, the second connection pad 312 is routed to the front surface of the PCB using a via. An opening 314 is provided for an armature that moves perpendicularly to the surface of the substrate in response to energizing the stator. The first and second coil layers can be constructed using the coil layers illustrated in FIGS. 1 and 2, or with similar trace patters arranged so that the coil layers produce a single direction of rotation around the opening 314. The implementations illustrated in FIG. 3A can be extended to include additional coil layers laminated to both sides of a planar substrate.

Figure 3B:
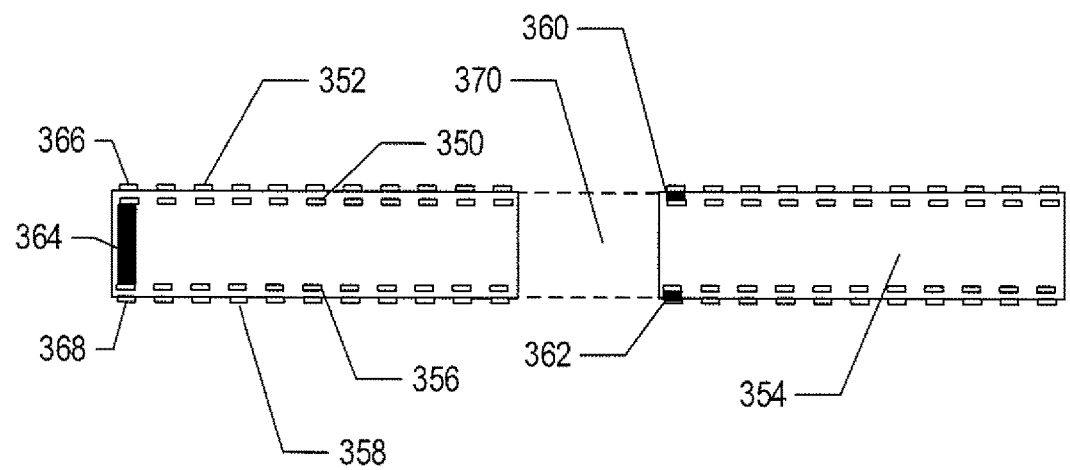
FIG. 3B illustrates a cross-section of a stator having four coil layers.

FIG. 3B illustrates a cross-section of a stator having four coil layers. A first-front coil layer 350 and a second-front coil layer 352 are laminated onto a front surface of an insulating planar substrate 354, such as a PCB. A first-back coil layer 356 and a second-back coil layer 358 are laminated onto a back surface of the insulating planar substrate 354. A first via 360 electrically connects the end of the first-front coil layer 350 to the beginning of second-front coil layer 352. A second via 362 electrically connects the end of the first-back coil layer 356 to the beginning of second-back coil layer 358. Cross-substrate via 364 connects the end of first-front coil layer 350 to the end of first-back coil layer 356. When current enters at an entry connection pad 366 and passes through the four coil layers, the current travels with a single direction of rotation until the current exits at an exit connection pad 368. The inductance of the stator in FIG. 3B is approximately double that of the stator shown in FIG. 3A.

Figure 3C:
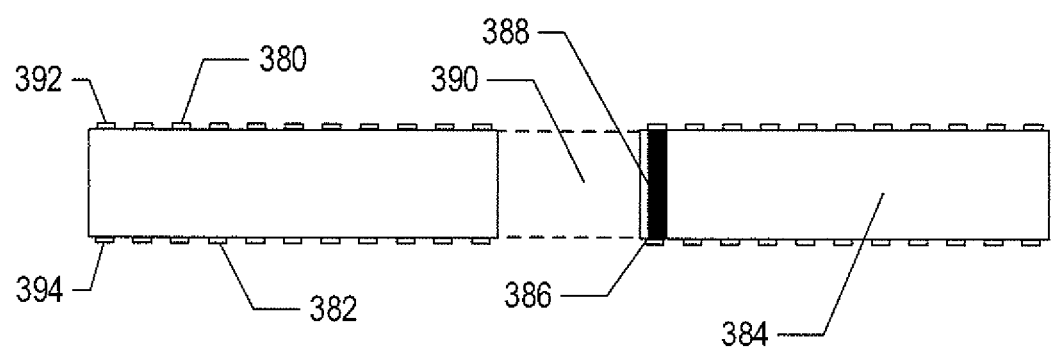
FIG. 3C illustrates a cross-section of a stator having two coil layers.

FIG. 3C illustrates a cross-section of a stator having two coil layers. A front coil layer 380 and a back coil layer 382 are laminated onto opposing sides of an insulating planar substrate 384, such as a PCB. A via 388 electrically connects the front coil layer 380 to the back coil layer 382 forming a coil wound in a single direction around the opening 390. Connection pads 392 and 394 provide electrical contacts for connecting the coil to a drive current.

In some implementations, the coil layers that make up the stator are not interconnected to form a single coil. For example, cross-substrate via 364 may be omitted, and the two front coil layers 350 and 352 are electrically driven independently from the two back coil layers 356 and 358. In other implementations, the two front coil layers 350 and 352 are counter-wound with respect to the two back coil layers 356 and 358. In this configuration, the magnetic fields generated in the opening 370 by the two front coil layers oppose the magnetic field generated by the two back coil layers.

PCBs are suitable substrates for making the coils and motors described in the current document. A PCB can be constructed using a PCB process where layers of printed copper are separated by a hard laminate core, for example, using FR-4 glass-reinforced epoxy. A PCB made from polyimide can support a greater density of coils and increased mechanical flexibility. A PCB made from a ceramic, such as aluminum oxide, provides increased heat resistance. The stators described above can be constructed with any of these PCB materials.

Motors

In certain implementations, the coil layers described above are arranged to form one or more coils that overlay the front and/or back surfaces of a PCB. The coils form a stator that drives the armature of a motor.

Figure 4A:
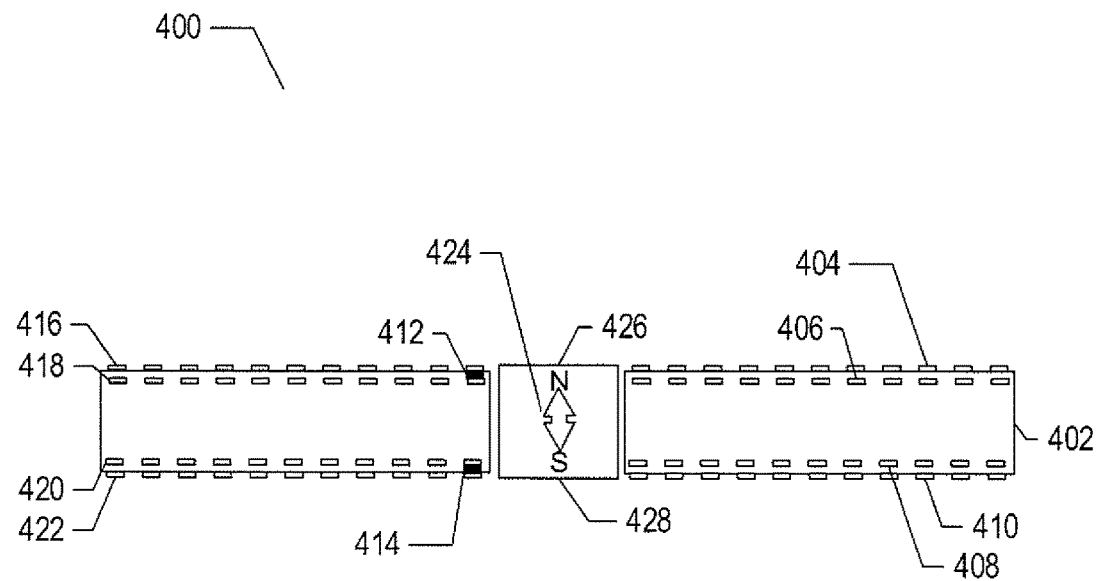
FIG. 4A illustrates a motor with a driving force that is perpendicular to the surface of a substrate.

FIG. 4A illustrates a motor with a driving force that is perpendicular to the surface of a substrate. The motor 400 is constructed on a substrate 402, such as a PCB. A first front coil layer 404 and a second front coil layer 406 overlay the front surface of the substrate 402. A first back coil layer 408 and a second back coil layer 410 overlay the back surface of the substrate. A first via 412 electrically connects the first front coil layer 404 to the second front coil layer 406 to form a front coil, and a second via 414 electrically connects the first back coil layer 408 to the second back coil layer 410 to form a back coil. Front coil connections 416 and 418 provide electrical connectivity for driving the front coil, and back coil connections 420 and 422 provide electrical connectivity for driving the back coil.

A magnetic armature 424 having a north pole 426 and a south pole 428 is positioned in an opening in the substrate 402 through the center of the front and back coils. In order to drive the magnetic armature 424 into vibration, a first oscillating current is applied to the front coil connections 416 and 418, and a second oscillating current is applied to the back coil connections 420 and 422. When the motor is operated, the current that flows through the front coil and the current that flows through the back coil flow with opposite directions of rotation. In certain implementations, this is accomplished by applying the same oscillating current to both front and back coils provided the coils are counter-wound. In an alternative implementation, where the coils are not counter-wound, the second oscillating current is 180 degrees out of phase with the first oscillating current. The resulting oscillating magnetic field provides a magneto-motive force to the north pole 426 and the south pole 428 in synchrony, driving the magnetic armature 424 into vibration at a frequency proportional to the frequency at which the oscillating current is applied. In an alternative implementation, the second front coil layer 406 is connected to the first back coil layer 408 with a third conductive via to form a single-drive counter-wound stator that is driven with a single oscillating current to produce vibratory motion of the armature.

The magnetic armature is constructed from an axially polarized magnet. In one implementation, the magnet is a neodymium grade N-42 disk magnet. The size and shape of the magnet is adapted based, in part, on the desired vibration profile of the motor.

Figure 4B:
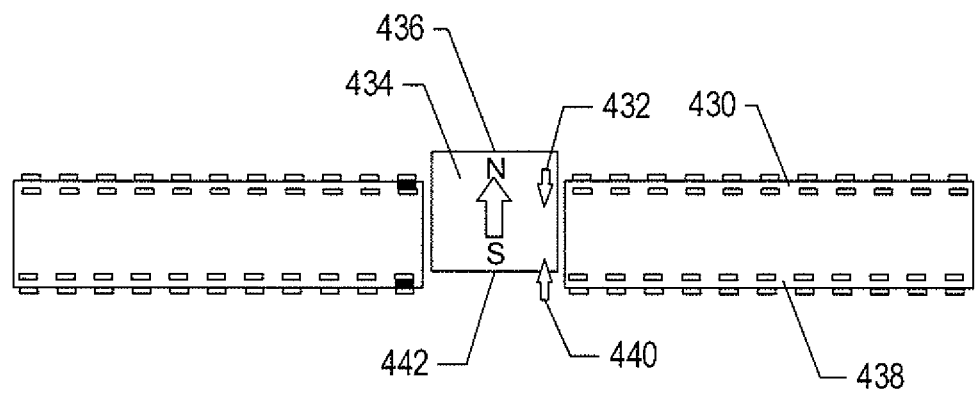
FIG. 4B illustrates the motor with a magnetic armature in an upward position.

FIG. 4B illustrates the motor with the magnetic armature in an upward position. When a first driving current is applied to a front coil 430, the front coil 430 generates a downward magnetic flux 432. In response to the downward magnetic flux 432, an upward vertical force is exerted on the north pole 436. As the first driving current is applied, a second driving current is applied to a back coil 438 and an upward magnetic flux 440 is generated. In response to the upward magnetic flux 440, an upward vertical force is exerted on the south pole 442 of the magnet. In response to the upward forces, the magnetic armature 434 moves upwards as illustrated in FIG. 4B.

Figure 4C:
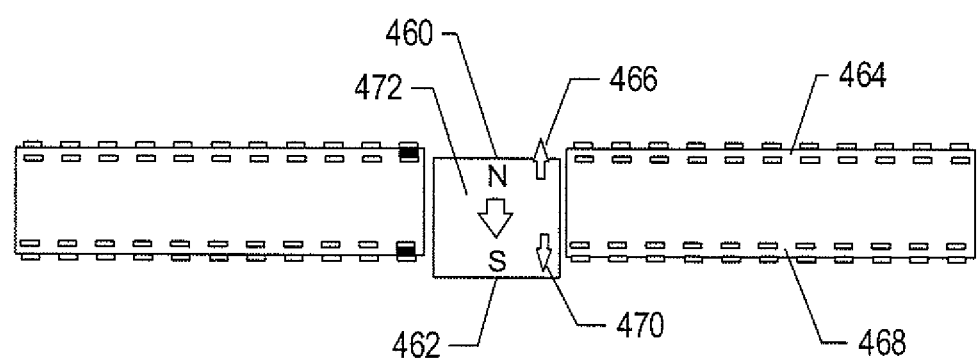
FIG. 4C illustrates the motor with a magnetic armature in a downward position.

FIG. 4C illustrates the motor with the magnetic armature in a downward position. When the direction of the first and second driving currents is reversed, the forces on the north pole 460 and south pole 462 are reversed. When the first reversed current is applied to a front coil 464, the front coil 464 generates an upward magnetic flux 466, and a downward vertical force is exerted on the north pole 460. When the second reversed current is applied to a back coil 468 a downward magnetic flux 470 is generated. A downward vertical force is exerted on the south pole 462 of the magnetic armature 472. In response to these two forces, the magnetic armature 472 moves downwards as illustrated in FIG. 4C.

The drive currents are alternated to cause the magnetic armature to vibrate perpendicularly to the surface of the substrate at a chosen frequency. In one implementation, the front coil and back coil are counter-wound with respect to each other. The front and back coils are connected with a conductive via or wire and driven with one drive current. This arrangement causes the front and back coils to generate simultaneous magnetic flux signals in opposing directions, which, in turn, acts on the north and south poles of the magnetic armature to drive the magnetic armature into vibration.

In alternative implementations, additional coil layers are employed. For example, an 8-layer PCB can have four front coil layers and four back coil layers. The four front coil layers are connected to form a front coil, and the four back coil layers are connected to form a back coil. In certain implementations, the front coil and back coil are counter wound, and driven with a single drive current as explained above.

Figure 4D:
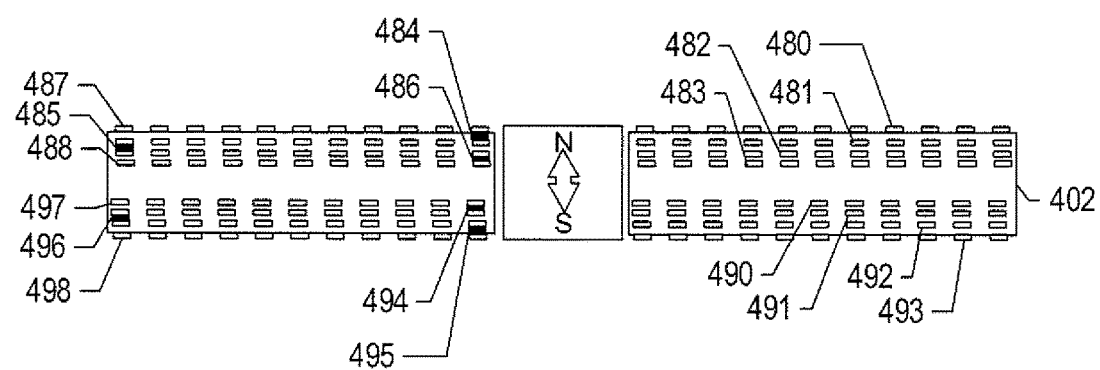
FIG. 4D illustrates a motor constructed on an 8-layer PCB.

FIG. 4D illustrates a motor constructed on an 8-layer PCB. Four front coil layers 480, 481, 482, and 483 are connected together with three front coil vias 484, 485, and 486. Together, the front coil layers form a front coil with front connection pads 487 and 488. Four back coil layers 490, 491, 492 and 493 are connected together with three back coil vias 494, 495, and 496. Together, the back coil layers form a back coil with back connection pads 497 and 498. Using the coil-stacking techniques illustrated in FIG. 4, motors can be constructed having stator assemblies with other numbers of coil layers.

Figure 5:
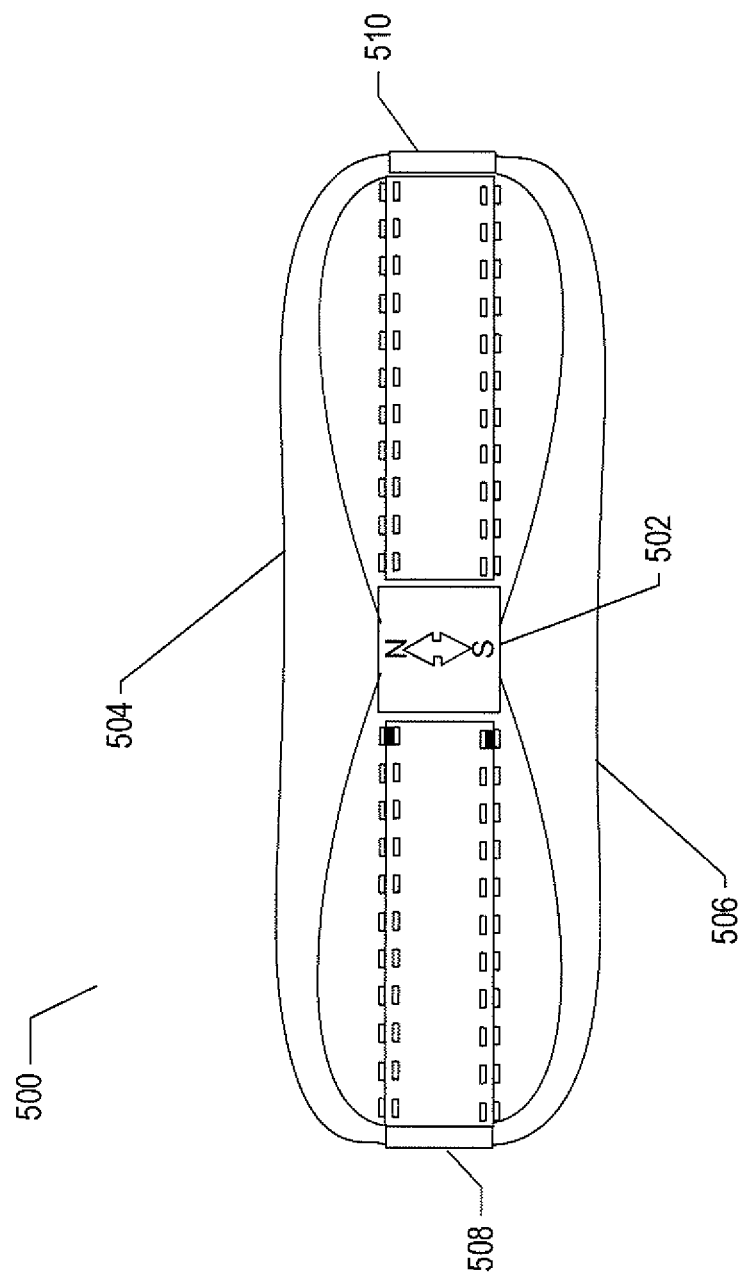
FIG. 5 illustrates a motor with retaining spring elements.

FIG. 5 illustrates a motor with retaining spring elements. The motor 500 includes a magnetic armature 502 that is retained in an opening with an front retaining spring 504 and a back retaining spring 506. The magnetic armature 502 is generally captive within the opening, but is allowed to move vertically when a drive force is applied to the armature that overcomes a centering force provided by the front and back retaining springs 504 and 506. In some implementations, either the front retaining spring 504 or the back retaining spring 506 are omitted and the magnetic armature attached to the remaining retaining spring. In some implementations, the front and back retaining springs are connected to each other with ties 508 and 510. The ties bear the force of the spring preload and reduce the forces on the PCB when the motor is in operation.

The front and back retaining springs 504 and 506 re-center the magnetic armature 502 within the opening when the stator is de-energized. In one implementation, the springs are made of a rubberized polymer, such as silicone, and moulded into a shape, such as that shown in FIG. 5, that provides centering forces for the magnetic armature 502 but that also allows for displacement of the magnetic armature 502 in a direction perpendicular to the plane of the substrate. The front and back retaining springs 504 and 506 and the magnetic armature 502 forms a mass-spring system. The mass-spring system has a degree of freedom in the direction perpendicular to the substrate. The mass-spring system has a resonant frequency at which the output of the system is boosted by the mass-spring system's quality factor. The resonant frequency varies based on the load applied to the motor. In certain implementations, the system is operated outside the characteristic frequency of the mass-spring system. In this case, the output force is approximately proportional to the input power, independent of the frequency, which enables production of a wide range of vibration frequencies.

Figure 6:
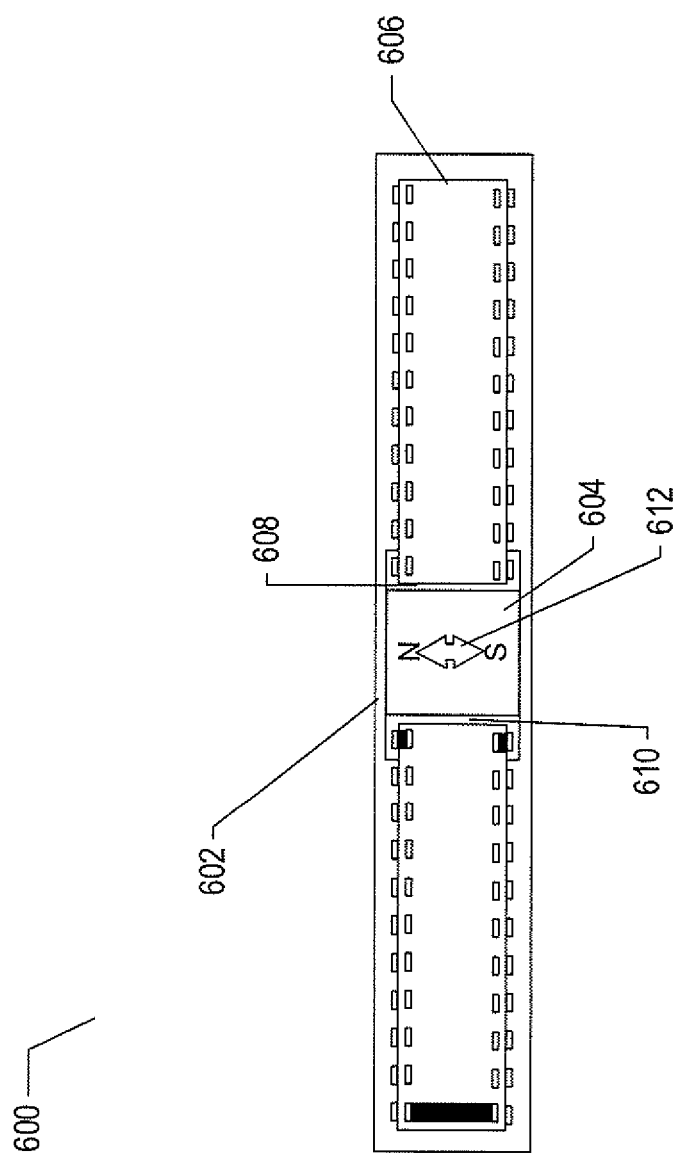
FIG. 6 illustrates a motor with an over-moulded retaining element.

FIG. 6 illustrates a motor with an over-moulded retaining element. The motor 600 is covered by a moulded retainer 602 that retains a magnetic armature 604 within an opening in a substrate 606. The moulded retainer 602 is made from a flexible mouldable material, such as plastic, silicone, rubber, or rubberized polymer. In the illustrated implementation, the moulded retainer 602 approximately encloses the motor 600. In other implementations, the moulded retainer is sized to retain the magnetic armature 604 in the opening in the substrate 606 and does not enclose the entire motor. The parameters of the over-moulding process are adjusted so that air gaps 608 and 610 are retained between the magnetic armature 604 and the substrate 606. The moulded retainer 602 functions as a centering spring returning the magnetic armature 604 to a neutral position when the motor's stator is not energized. The moulded retainer is flexible and allows for limited motion of the magnetic armature 604 in a direction approximately perpendicular 612 to the substrate. In some implementations, the retaining springs illustrated in FIG. 5 and the moulded retainer illustrated in FIG. 6 have holes or openings to allow air exchange between the interior of the motor and the external environment to equalize internal and external air pressure.

FIG. 7A illustrates a motor with symmetric magnetic retaining elements. The motor 700 has a magnetic armature 702 that is acted upon by forces from a first magnetic retainer 704 and a second magnetic retainer 706. The first and second magnetic retainers are positioned symmetrically around the armature so that the net lateral magnetic forces on the magnetic armature are approximately nulled when the armature is positioned in an opening in a substrate 708. The magnetic orientation of the first and second magnetic retainers 704 and 706 is the opposite of the magnetic orientation of the magnetic armature 702. The vertical forces exerted by the magnetic retainers movably retain the magnetic armature 702 within the opening in the substrate 708. In an alternative implementation, a single ring-shaped magnetic retainer surrounding the stator of the motor is substituted for the first and second magnetic retainers 704 and 706.

FIG. 7B illustrates a motor with an asymmetric magnetic retaining element. The motor 750 has a magnetic armature 752 that is retained in an opening in a substrate 754 by a magnetic retainer 756. The magnetic retainer exerts lateral force on the magnetic armature 752, attracting the magnetic armature 752 to a side of the opening in the substrate 754. When the motor operates, the magnetic armature 752 slides vertically along the sides of the opening. To facilitate more efficient motor operation. In some implementations the side of the opening is coated with a low-friction coating, such as Teflon. In one implementation, the magnetic armature 752 is treated with a low-friction coating. The vertical forces exerted by the magnetic retainer 756 movably retain the magnetic armature 752 within the opening of the substrate 754.

Figure 8:
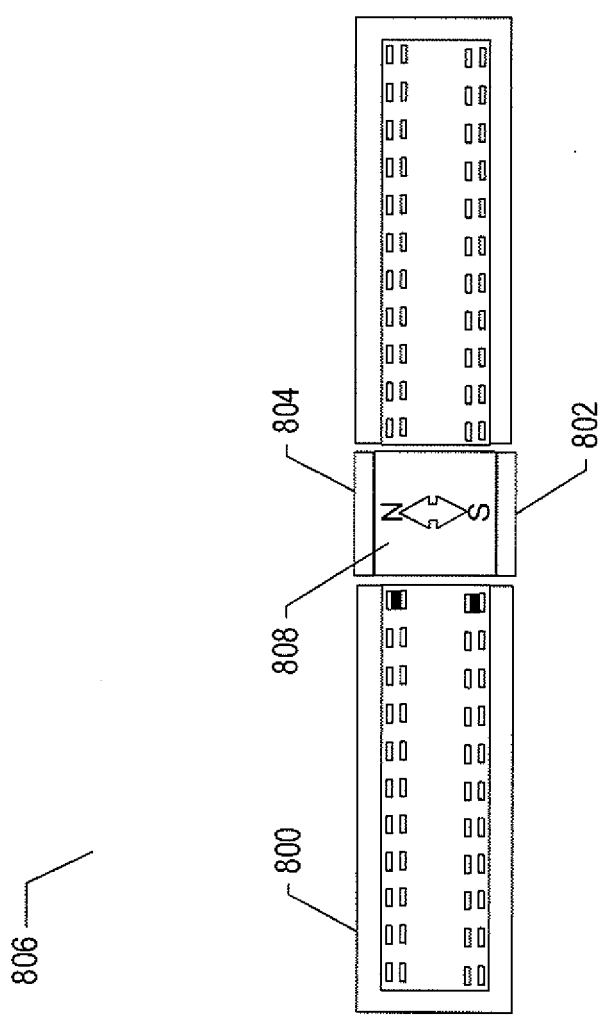
FIG. 8 illustrates a motor encapsulated with a magnetic core material.

FIG. 8 illustrates a motor encapsulated with a magnetic core material. The addition of magnetic cores 800, 802, and 804 reduce the magnetic reluctance in the flux path used by the motor 806. The magnetic cores are made from materials having substantial magnetic permeability, such as iron, ferrite, or steel. When magnetic cores are used, the magnetic flux from the motor 806 is approximately confined to a low-reluctance path defined by the magnetic cores, thus focusing the flux onto the magnetic armature 808 and increasing overall efficiency of the motor 806. In certain implementations, the magnetic cores 800, 802, and 804 utilize laminated construction to reduce eddy currents.

Figure 9A:
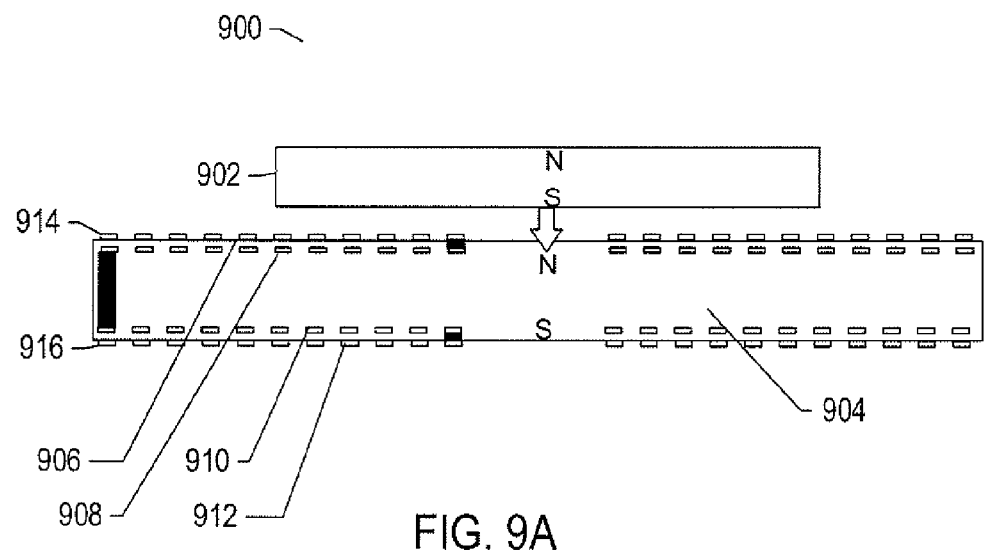
FIGS. 9A and 9B illustrate a motor with a disk-shaped magnetic armature.
Figure 9B:
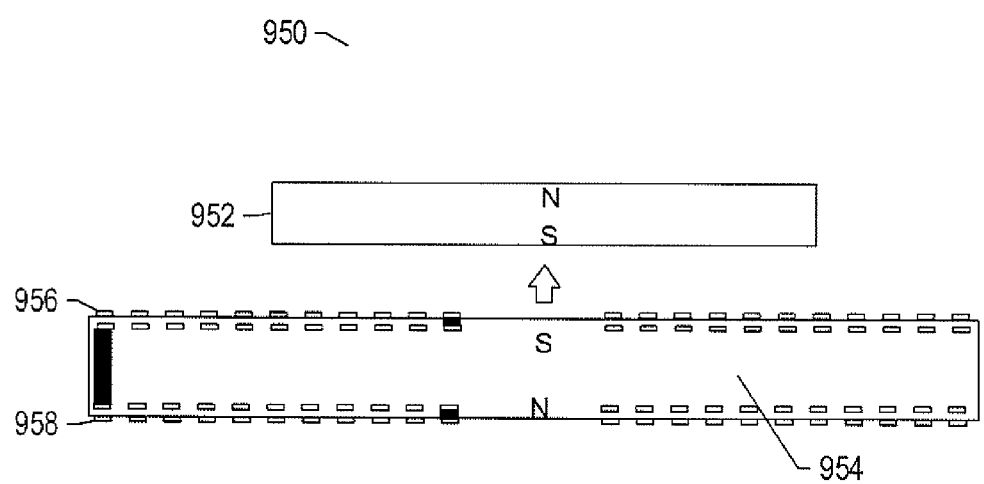

FIGS. 9A and 9B illustrate a motor with a disk-shaped magnetic armature. FIG. 9A illustrates a motor 900 with a disk-shaped magnetic armature 902 in a downward position. A stator 904 is formed from four coil layers 906, 908, 910, and 912 wired in series so that the coil layers are wound with a single direction of rotation. When a first driving current is applied to the stator at connection terminals 914 and 916, the stator generates a north pole near the south pole of the disk-shaped magnetic armature. As a result, the disk-shaped magnetic armature is attracted to the stator as illustrated in FIG. 9A. When the first current is reversed, the forces on the disk-shaped magnetic armature are reversed and the disk-shaped magnetic armature moves as shown in FIG. 9B.

FIG. 9B illustrates motor 950 with a disk-shaped magnetic armature 952 in an upward position. A stator 954 is arranged similarly to the stator 904 in FIG. 9A. When the stator 954 is energized with a reversed first current at connection terminals 956 and 958, a magnetic south pole is generated near the disk-shaped magnetic armature 952, and the disk-shaped magnetic armature 952 is repulsed upwards as shown in FIG. 9B.

The stator can be made using the various techniques described in this document, and may include a larger or smaller number of coil layers on one or both sides of a substrate. In the motors illustrated in FIGS. 9A and 9B, the coil layers are oriented and interconnected to form a single coil that directs electric current in a single direction of rotation. In some implementations, a ferrous core is placed at the center of the stator to increase the force applied to the armature. In certain implementations, Suitable cores are made of iron, steel, or ferrite. Alternatively, there is no opening in the stator.

Figure 10A:
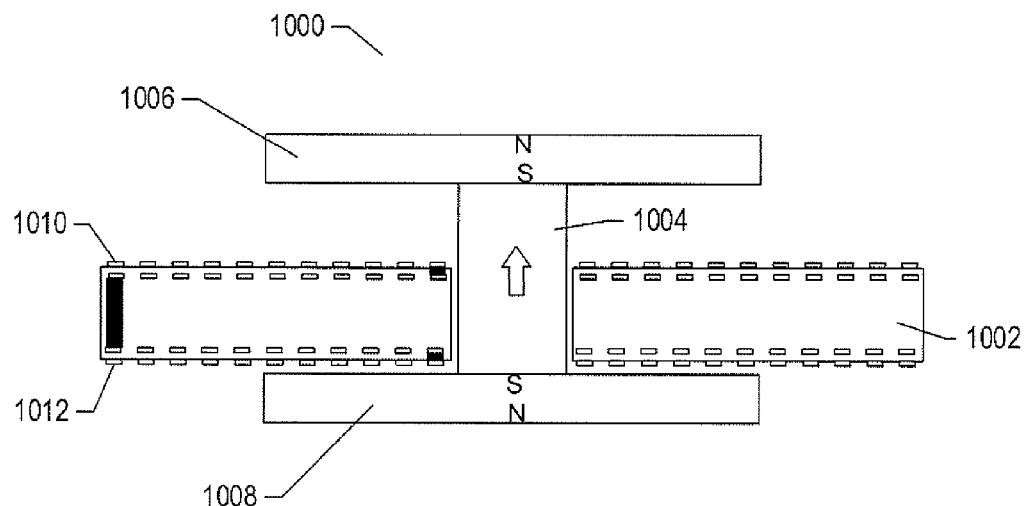
FIGS. 10A and 10B illustrate a motor with disk-shaped magnetic armatures retained by a central tie.
Figure 10B:
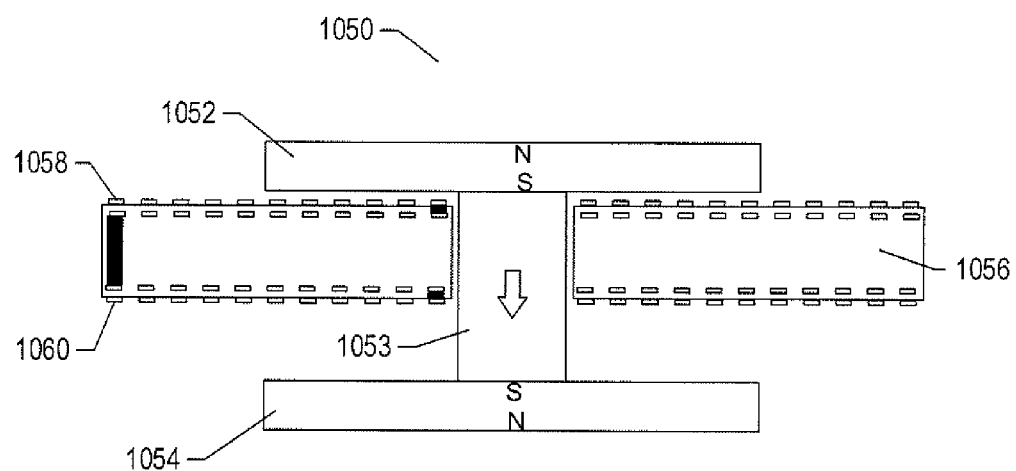

FIGS. 10A and 10B illustrate a motor with disk-shaped magnetic armatures retained by a central tie. FIG. 10A illustrates a motor 1000 having a stator 1002 with an opening to permit passage of a tie 1004. A first magnetic armature 1006 is attached to a first end of the tie 1004. A second magnetic armature 1008 is attached to a second end of the tie 1004. The first and second magnetic armatures 1006 and 1008 are oriented so that like magnetic poles are facing the stator 1002. The stator 1002 is a single coil that electrical current flows around in a single rotational direction. When a drive current is applied to the stator 1002 through the connection terminals 1010 and 1012, a magnetic field is generated by the stator 1002 that repulses the first magnetic armature 1006 and attracts the second magnetic armature 1008. In response to these forces the armature moves upwards, as shown in FIG. 10A. FIG. 10B illustrates a motor 1050 with a first magnetic armature 1052 connected with a tie 1053 to a second magnetic armature 1054 in a downward-driven position. When the drive current is reversed and applied to stator 1056 through connection pads 1058 and 1060, a magnetic field is created that attracts the first magnetic armature 1052 and that repels the second magnetic armature. In certain implementations, the magnetic armatures are made from magnetic materials already described above, and the tie is made from a non-conductive, non-magnetic material. When the tie is made from a conductive material, laminated construction will limit induced eddy currents in the tie when the motor is in operation.

Figure 10C:
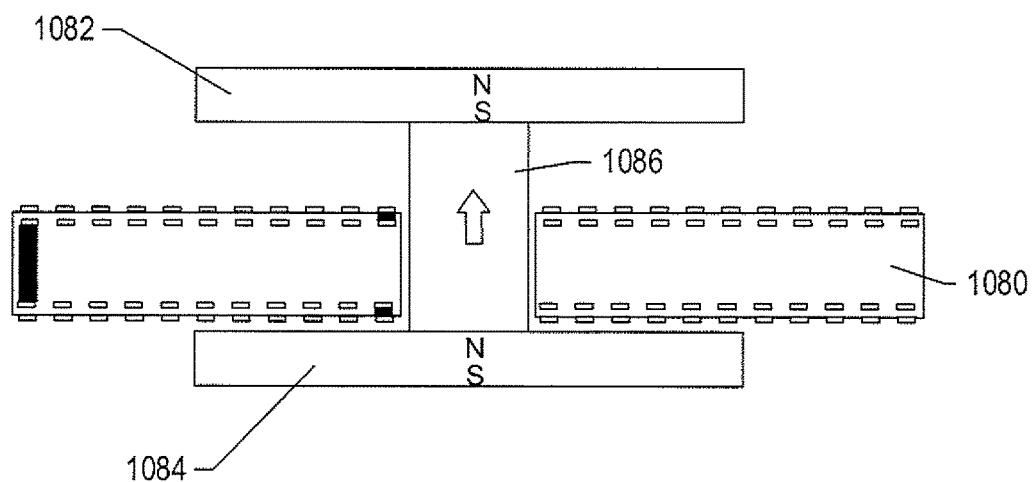
FIG. 10C illustrates a motor with magnetically aligned magnetic armatures retained by a central tie.

FIG. 10C illustrates a motor with magnetically aligned magnetic armatures retained by a central tie. A stator 1080 is made from a counter-wound coil, and a first armature 1082 and a second magnetic armature 1084 have the same magnetic orientation. In this implementation, a tie 1086 is made from either magnetic or non-magnetic material. When the tie 1086 is made from magnetic material, the tie has the same magnetic orientation as the magnetic armatures. In some implementations, the tie 1086 is made from magnetically permeable material, such as iron or steel.

Figure 11:
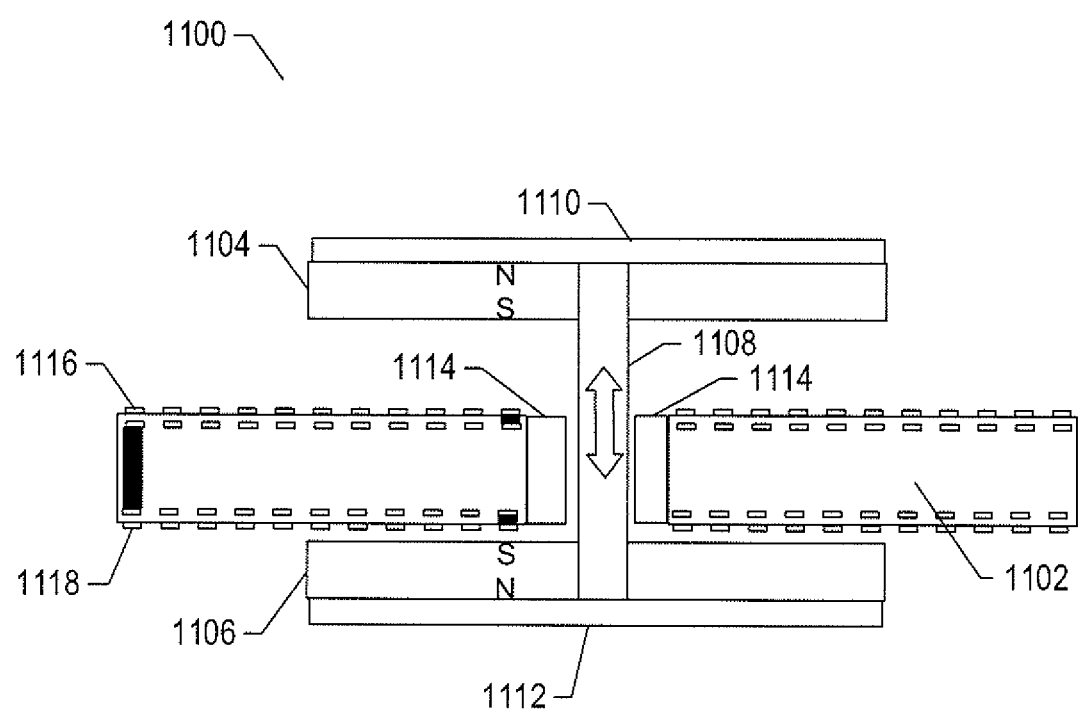
FIG. 11 illustrates a motor with washer-shaped magnetic armatures retained by a central tie with retaining caps.

FIG. 11 illustrates a motor with washer-shaped magnetic armatures retained by a central tie with retaining caps. The motor 1100 includes a stator 1102. The stator has a single coil with a single winding direction. A first magnetic armature 1104 and a second magnetic armature 1106 have opposing north/south axial magnetic orientations. In an alternate implementation, the first magnetic armature 1104 and the second magnetic armature 1106 have the same axial magnetic orientations. The stator 1102 is a counter-wound coil with top coil layers wound with the opposite direction of rotation of the bottom coil layers. An insulating non-magnetic tie 1108 connects the first and second magnetic armatures. The first and second armatures are further secured with first and second end caps 1110 and 1112. In certain implementations, the end caps are made from magnetically permeable material, to facilitate confinement of the magnetic flux generated from the motor. An optional core sleeve 1114 made from ferrous material, such as iron or steel, is fixed within the core of the stator 1102.

In a first mode of operation, an oscillating driving current is applied to the stator through connection pads 1116 and 1118. The magnetic armatures 1104 and 1106 are driven to oscillate vertically in sync with the oscillating current. The end caps 1110 and 1112 can be made from a magnetically permeable material to constrain the magnetic flux generated by operation of the motor.

In a second mode of operation, the motor 1100 is operated as a bi-directional bi-stable solenoid. The core sleeve 1114 amplifies the magnetic field generated by the energized stator 1102. The magnetic armatures 1104 and 1106 move vertically in response to the generated magnetic field. When current is removed from the stator, the generated magnetic field collapses and the magnetic armature closest to the core sleeve 1114 is attracted to the core sleeve and retained in position.

The direction of the driving force of the motors illustrated in FIGS. 9A-11 is determined by the direction of the stator's coil windings, the magnetic orientation of the magnetic armatures, and the direction of the electrical driving current through the coil. The driving force of the motors is reversed by reversing any one of these parameters.

Figure 12A:
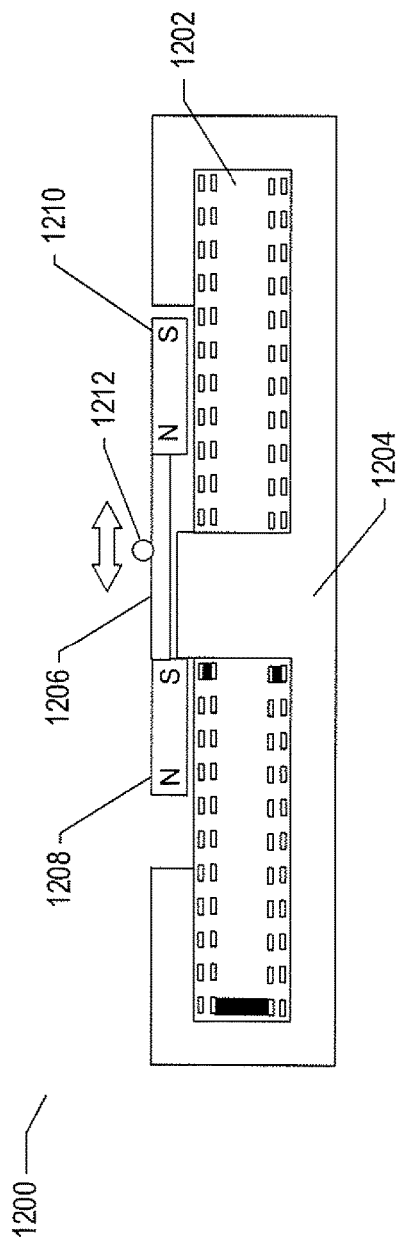
FIG. 12A illustrates a motor with a driving force parallel to the surface of a PCB.

FIG. 12A illustrates a motor with a driving force parallel to the surface of the PCB. The motor 1200 includes a stator 1202 made from a 4-layer PCB having four connected coil layers with a single winding direction. An E-shaped core 1204 directs the magnetic flux generated by the stator to an armature assembly 1206. The armature assembly 1206 includes a first magnet 1208 and a second magnet 1210. When an oscillating current is applied to the stator, the magnetic field drives the armature assembly 1206 into vibration parallel to the surface of the PCB. A centering spring 1212 is attached to the armature assembly 1206 and centers the armature assembly 1206 when the driving force is removed. The E-shaped core 1204 is made from permeable magnetic material, such as iron, steel, or ferrite.

Figure 12B:
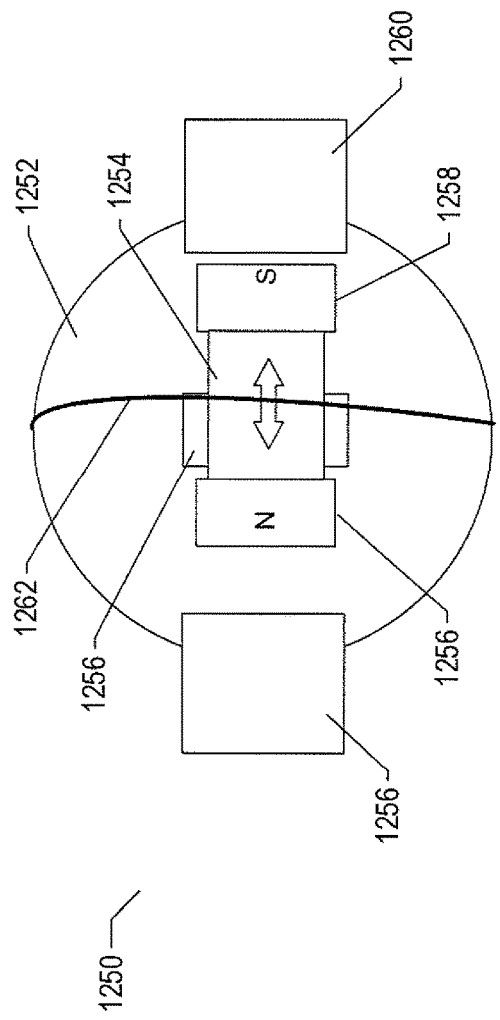
FIG. 12B illustrates a top view of a motor having a driving force parallel to the surface of a PCB.

FIG. 12B illustrates a top view of the motor shown in FIG. 12A having a driving force parallel to the surface of the PCB. The motor 1250 has a stator 1252 that is constructed on a PCB and an armature assembly 1254. The armature assembly 1254 has a first magnet 1256 and a second magnet 1258. An E-shaped core 1260 directs the magnetic flux to the armature assembly 1254. When an oscillating current is applied to the stator 1252, the magnetic field drives the armature assembly 1254 into vibration in direction parallel to the surface of the PCB. A centering spring 1262 is attached to the armature assembly and returns the armature assembly 1254 to a centered position over the stator 1252 when there is no driving force from the stator.

The centering spring illustrated in FIGS. 12A and 12B is a conductive wire, but in other implementations is a non-conductive fibber, polymer, elastomer or other centering spring structure discussed in this document.

Motor Applications

The motors described in the current document can be applied in environments where space is limited. Such environments include mobile devices, such as cellular phones, where vibration is used to communicate notifications to a human user.

Figure 13:
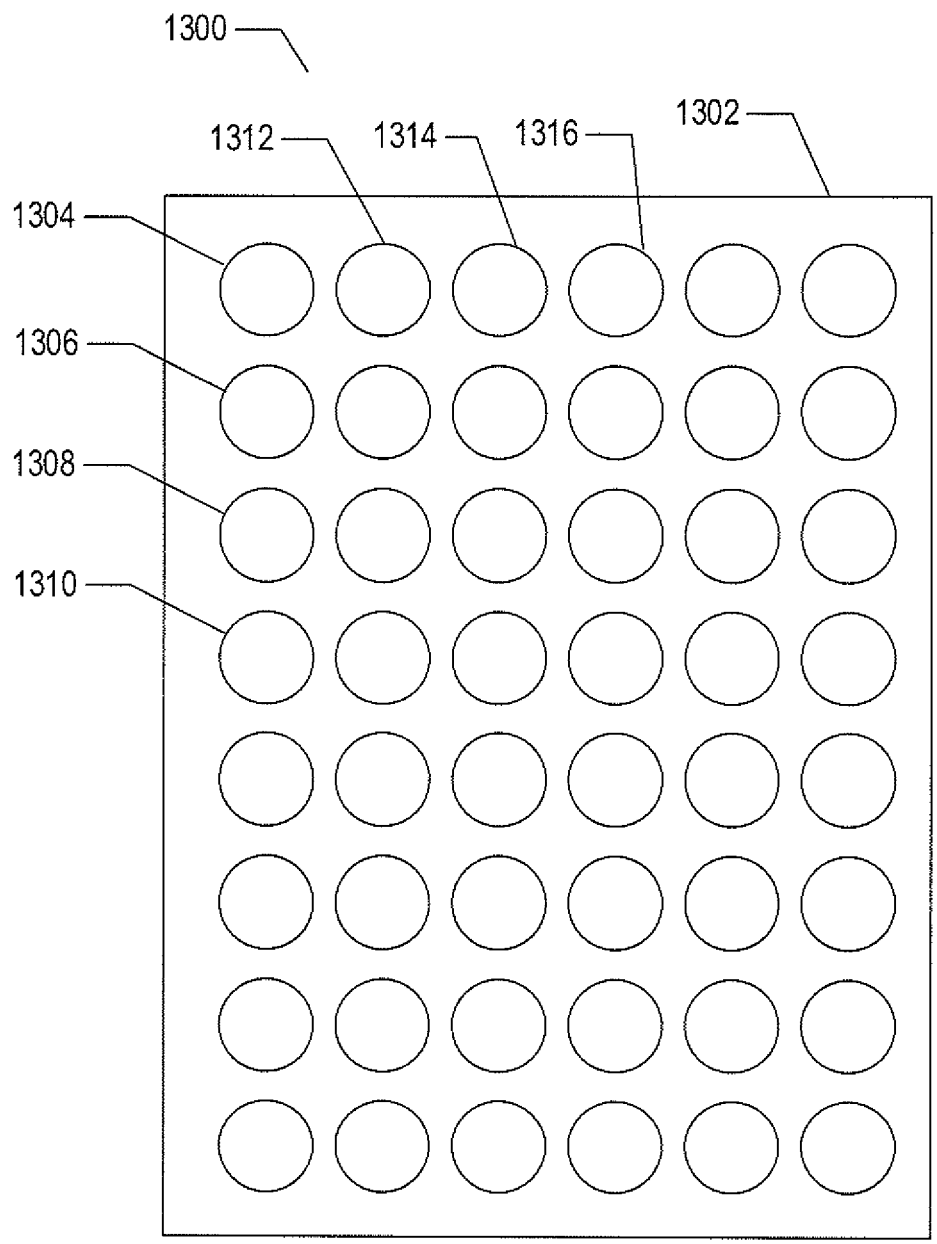
FIG. 13 illustrates a motor array.

FIG. 13 illustrates a motor array. A motor array 1300 is constructed on a substrate 1302, such as a multi-layer PCB. A plurality of motors 1304, 1306, 1308, 1310, 1312, 1314, 1316 are arranged in a rectangular pattern on the substrate. In other implementations, the motors are arranged in hexagons or other selected patterns. When the motors are operated in unison the motor array produces proportionally more intense vibration. In some applications, the motors is operated in a synchronized fashion to produce vibratory waves or patterns that move across the substrate 1302. The motor array 1300 can present vibratory patterns, such as those used in braille readers, or vision replacement systems for the blind.

Figure 14:
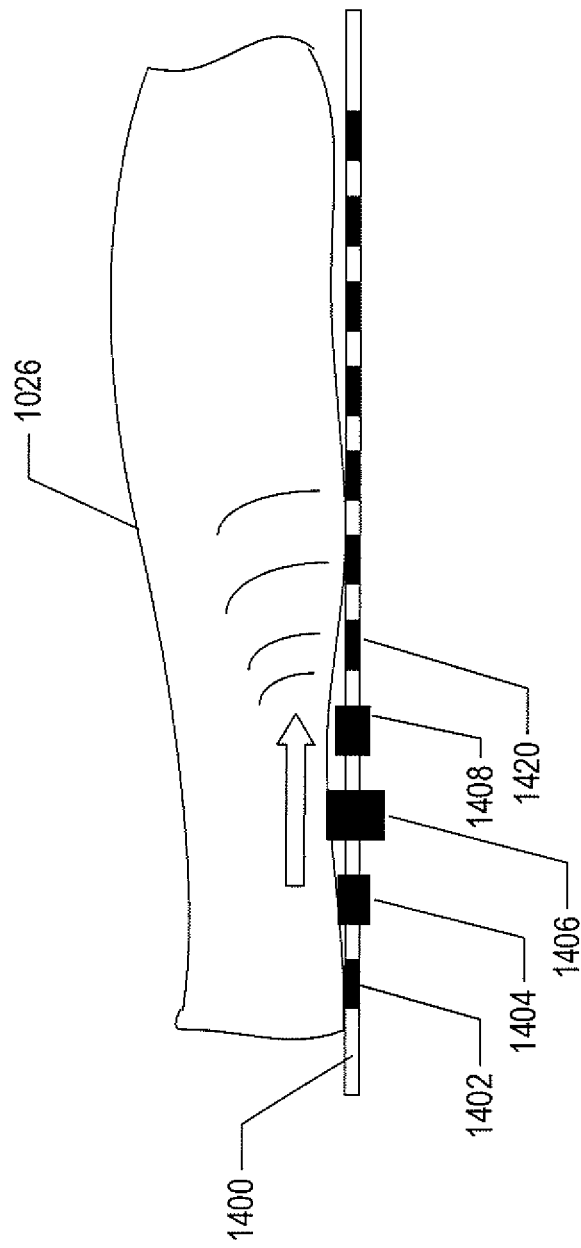
FIG. 14 illustrates a mode of operation of a motor array.

FIG. 14 illustrates a mode of operation of a motor array. A motor array 1400 is contacted by a sensing surface 1026, such as human skin or clothing. Motors 1402, 1404, 1406, 1408, and 1410 vibrate in sequential order to generate a vibration wave that travels from left to right as indicated by the arrow on FIG. 14. The vibration wave can travel the length of the motor array 1400, and can be reversed to travel from right to left when the wave reaches the rightmost end of the motor array. Vibration waves formed in this way are distinctive and identifiable to a human user.

Figure 15:
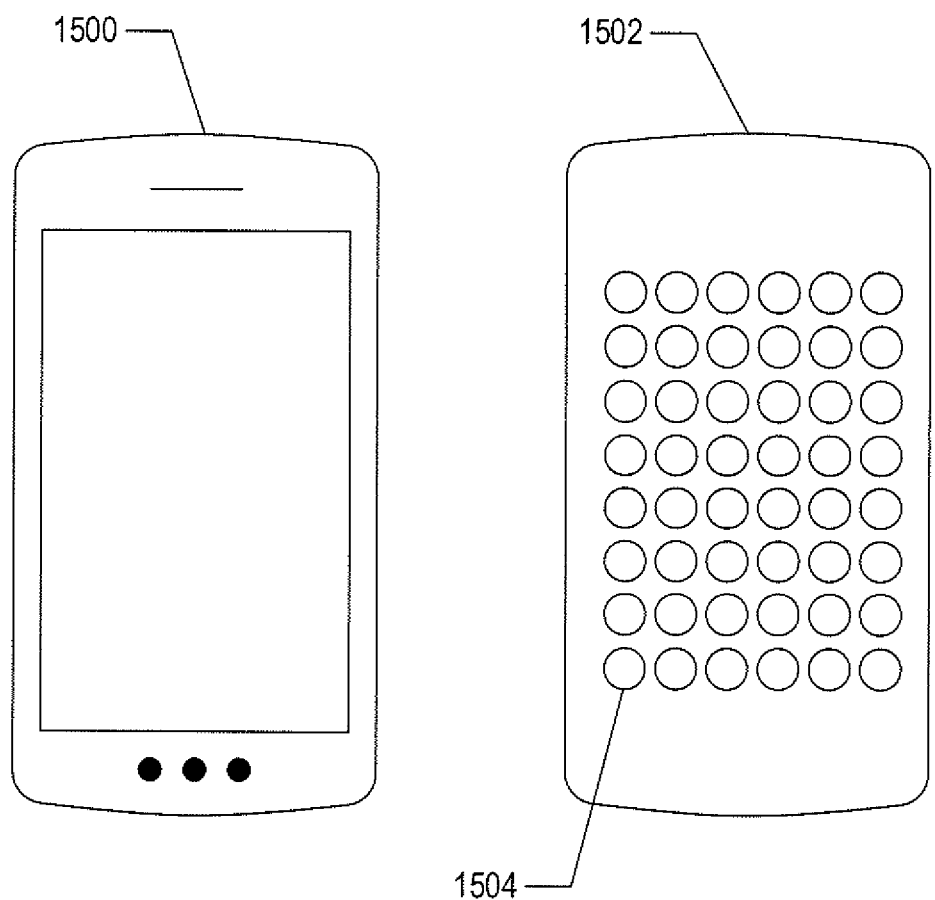
FIG. 15 illustrates a motor array installed on a smart phone.

FIG. 15 illustrates a motor array installed on a smart phone. A motor array 1504 is integrated onto the back side 1502 of a mobile device 1500 as illustrated in FIG. 15. In one implementation, vibratory notification features are added to existing mobile by integrating the motor array 1504 into a smart phone cover. The motor array 1504 generates distinctive and identifiable frequencies and patterns of vibration in response to events or notifications on the mobile device 1500, such as receiving an e-mail or phone call.

Generator Applications

In at least one configuration, the coils and motors described in the present document are used to generate electrical power from vibration or electromagnetic induction. In some implementations, the motor is used as a motion sensor.

Figure 16A:
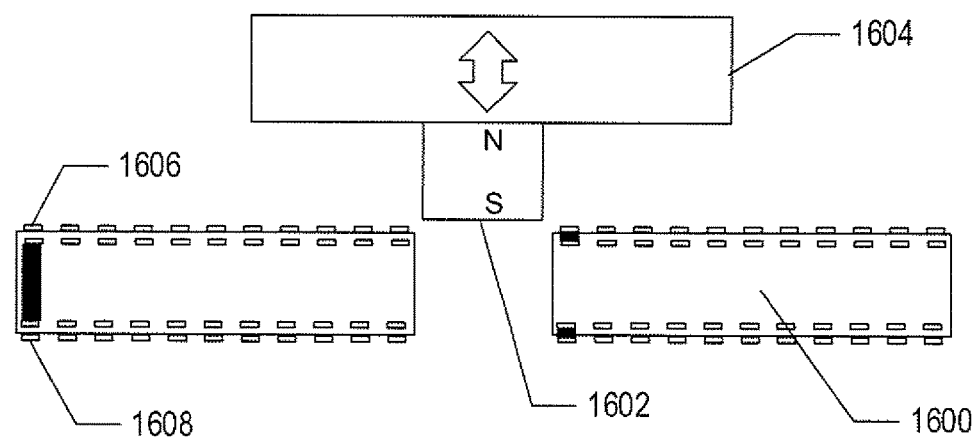
FIG. 16A illustrates a first coil configuration for generating electric current.

FIG. 16A illustrates a configuration for generating electric current from vibratory motion. A pickup coil 1600 is formed on a 4-layer PCB having 4 connected coil layers with a single winding direction. A magnetic element 1602 is suspended above an opening at the center of the pickup coil 1600. The magnetic element 1602 is connected to a plunger 1604 that vibrates perpendicularly to the PCB in response to external stimulus. The motion of the magnetic element 1602 creates a variable magnetic flux through the pickup coil 1600 and a corresponding electrical signal appears at connection pads 1606 and 1608. In certain applications, the coil configuration illustrated in FIG. 16A is used as a motion sensor, a microphone, or as a way to convert vibratory motion into electrical energy.

Figure 16B:
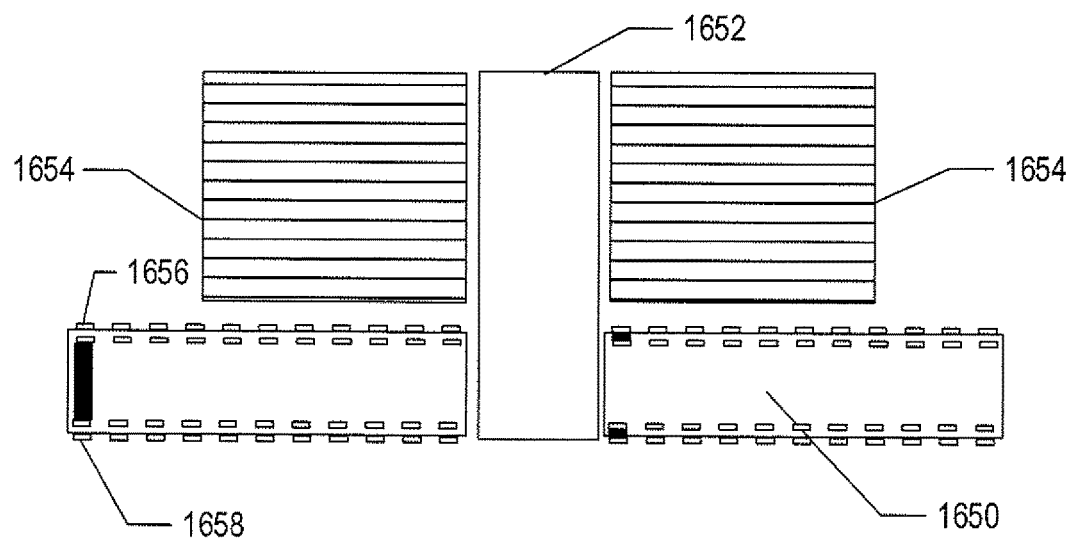
FIG. 16B illustrates a second coil configuration for generating electric current.

FIG. 16B illustrates a configuration for transferring electric current. A pickup coil 1650 is formed on a 4-layer PCB having 4 connected coil layers that form coil with a single direction of winding. A linking core 1652 made from ferrite or other magnetic material extends through the center of the pickup coil 1650 and through the center of a power coil 1654. The power coil 1654 and pickup coil 1650 are magnetically linked so that approximately the same magnetic flux passes through both coils. Power is transferred between the coils by applying an oscillating current to the power coil 1654 that induces a corresponding current in the pickup coil 1650. In certain implementations, the electrical energy is harvested from the pickup coil by connecting an electrical load to connection pads 1656 and 1658. In some implementations an air core is substituted for the linking core 1652.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A motor assembly comprising:
 a planar substrate;
 a spiral-shaped conductive trace overlying the planar substrate and wound about an aperture; and
 a magnetic armature that oscillates within the aperture when an oscillating current is applied to the spiral-shaped conductive trace.

2. The motor assembly of claim 1 wherein the planar substrate has a front side and a back side and wherein the spiral-shaped conductive trace overlies the front side, the motor assembly further comprising:
 a second spiral-shaped conductive trace having a direction of rotation opposite the spiral-shaped conductive trace and overlying the back side; and
 a first conductive via connecting the spiral-shaped conductive trace and the second spiral-shaped conductive trace.

3. The motor assembly of claim 2 further comprising:
 a first insulating layer overlying the spiral-shaped conductive trace;
 a third spiral-shaped conductive trace wound opposite from the spiral-shaped conductive trace and overlying the first insulating layer;
 a second insulating layer overlying the second spiral-shaped conductive trace;
 a fourth spiral-shaped conductive trace wound opposite from the second spiral-shaped conductive trace and overlying the second insulating layer;
 a second conductive via connecting the spiral-shaped conductive trace and the third spiral-shaped conductive trace; and
 a third conductive via connecting the second spiral-shaped conductive trace and the fourth spiral-shaped conductive trace.

4. The motor assembly of claim 3 wherein, when a current is applied to the third spiral-shaped conductive trace, the current flows in a common winding direction through the four spiral-shaped conductive traces.

5. The motor assembly of claim 3 wherein, when a current is applied to the third spiral-shaped conductive trace, the current flows in a first winding direction through the spiral-shaped conductive trace and the third spiral-shaped conductive trace and in a second winding direction through the second spiral-shaped conductive trace and the fourth spiral-shaped conductive trace.

6. The motor assembly of claim 1 further comprising:
 a retaining spring that returns the magnetic armature to a centered position.

7. The motor assembly of claim 6 wherein the retaining spring is made from flexible polymer moulded over the magnetic armature and over the planar substrate while retaining air gaps between the planar substrate and magnetic armature.

8. The motor assembly of claim 6 wherein the retaining spring includes:
 an upper retaining spring having a first-upper end a second-upper end and a center-upper portion;
 a lower retaining spring having a first-lower end a second-lower end and a center-lower portion;
 a first tie that penetrates the substrate and connects the first-lower end to the first-upper end; and
 a second tie that penetrates the substrate and connects the second-lower end to the second-upper end.

9. The motor assembly of claim 1 further comprising:
 a magnetic retainer positioned aside the magnetic armature and having a magnetic orientation that is the opposite of the magnetic orientation of the magnetic armature.

10. The motor assembly of claim 9 wherein the magnetic retainer encircles the spiral-shaped conductive trace.

11. The motor assembly of claim 1 further comprising a core enclosing the motor.

12. A motor assembly comprising:
 a planar substrate;
 a spiral-shaped conductive trace overlying the planar substrate; and a magnetic armature that oscillates above the planar substrate when an oscillating current is applied to the spiral-shaped conductive trace.

13. The motor of claim 12 further comprising:
a retaining spring attached to the magnetic armature.

14. The motor assembly of claim 13 further comprising:
a second magnetic armature positioned below the planar substrate;
an opening in the planar substrate; and
a tie positioned in the opening that connects the magnetic armature to the second magnetic armature.

15. The motor assembly of claim 14 further comprising:
a ferrous sleeve that lines the opening in the planar substrate.

16. The motor assembly of claim 15 further comprising:
a first end cap laminated to the magnetic armature and connected to a first end of the tie; and
a second end cap laminated to the second magnetic armature and connected to a second end of the tie.

17. A motor assembly comprising:
a planar substrate;
a spiral-shaped conductive trace overlying the planar substrate;
an E-shaped core having outer legs formed around the spiral-shaped conductive trace and a central leg positioned in an opening in the planar substrate;
an armature assembly positioned between the two outer legs of the E-shaped core and having a first magnet and a second magnet connected with a tie; and
a retaining spring connected to the armature assembly.

18. A motor array comprising:
a planar substrate; and
a plurality of vibratory motors attached to the substrate, the vibratory motors producing vibratory motion approximately perpendicular to the planar substrate and the vibratory motors independently operable.

19. The motor array of claim 18 wherein the planar substrate is a cell phone case.

20. The motor array of claim 19 wherein a notification from the cell phone causes the sequential activation of adjacent vibratory motors to produce a vibration wave.

* * * * *